US012645675B2

(12) United States Patent

Vellanki et al.

(10) Patent No.: US 12,645,675 B2

(45) Date of Patent: Jun. 2, 2026

(54) STORING AND QUERYING ALTERNATE SCENARIOS OF DATA IN A DATABASE

(71) Applicant: Goldman Sachs & Co. LLC, New York, NY (US)

(72) Inventors: Mahesh K. Vellanki, Kendall Park, NJ (US); Mehul Shah, Chesterfield, NJ (US); Sumit Kumar Rastogi, Bengaluru (IN); Kishor Pangaluru, Croydon (GB)

(73) Assignee: Goldman Sachs & Co. LLC, New York, NY (US)

( * ) Notice: Subject to any disclaimer, the term of this patent is extended or adjusted under 35 U.S.C. 154(b) by 54 days.

(21) Appl. No.: 18/679,035

(22) Filed: May 30, 2024

(65) Prior Publication Data

US 2025/0328531 A1 Oct. 23, 2025

(30) Foreign Application Priority Data

Apr. 18, 2024 (IN) .............................. 202411031161

(51) Int. Cl.
*G06F 16/2455* (2019.01)
(52) U.S. Cl.
CPC ................................ *G06F 16/2455* (2019.01)

(58) Field of Classification Search
CPC .................................................... G06F 16/2455
See application file for complete search history.

(56) References Cited

U.S. PATENT DOCUMENTS

2013/0086019 A1* 4/2013 Dantale ................. G06F 16/248
707/705

* cited by examiner

*Primary Examiner* — Grace Park
(74) *Attorney, Agent, or Firm* — Fenwick & West LLP

(57) ABSTRACT

A system allows users to define alternate scenarios in a database to allow users to analyze the data to determine what happens if certain values of some of the fields were different from the values stored in the database during its actual operation. The system stores a source dataset representing data of a source database, for example, a production database. The system receives an alternate scenario specification that includes instructions for determining alternate values for a portion of the database. The system determines an alternate dataset comprising alternate values for a portion of the database as defined by the alternate scenario specification. The system receives requests to process database queries for one or more alternate scenarios. The system combines data from the source dataset and the alternate datasets corresponding to the alternate scenarios specified by the request to process database queries.

18 Claims, 9 Drawing Sheets

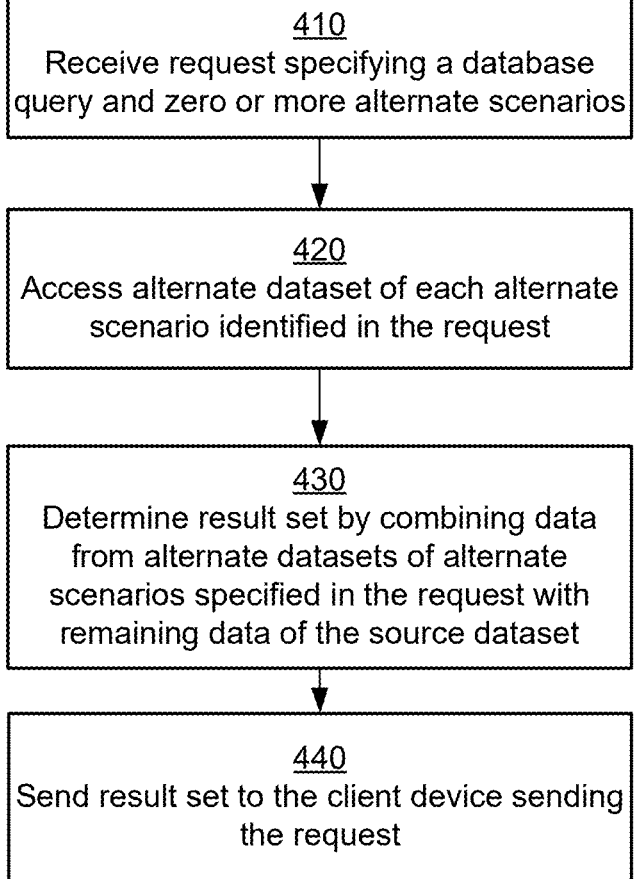

410
Receive request specifying a database
query and zero or more alternate scenarios 420
Access alternate dataset of each alternate
scenario identified in the request 430
Determine result set by combining data
from alternate datasets of alternate
scenarios specified in the request with
remaining data of the source dataset 440
Send result set to the client device sending
the request

FIG. 4

STORING AND QUERYING ALTERNATE SCENARIOS OF DATA IN A DATABASE

CROSS-REFERENCE TO RELATED APPLICATION

This application claims the benefit of Indian Provisional Application No. 202411031161, filed on Apr. 18, 2024, which is hereby incorporated by reference in its entirety.

FIELD OF ART

The disclosure relates to databases in general and more specifically to specifying alternate scenarios of data in a database and querying them.

BACKGROUND

An organization typically maintains one or more databases for storing information obtained in a production environment. The database may be a document database that stores documents, a relational database that stores relational tables, or any other type of databases. Clients interact with the database using an interface such as APIs (application programming interfaces) based on a database language, for example, structured query language (SQL). A production database system may receive various types of requests such as queries as well as requests for executing transactions that may add, modify, or delete records or documents. Organizations analyze their data, for example, to make decisions related to activities of the organization. However, processing data stored in a production database is challenging since the processing performed for analysis may put additional load on the production database, thereby slowing the performance of the production system. Solutions that make a copy of the production database are inadequate since the copy represents a snapshot of the production database at a point in time and does not capture the ongoing changes of the production database.

SUMMARY

A system, for example, an online system allows users to define alternate scenarios in a database to allow users to analyze the data stored in the database for a what-if scenario. For example, the user can analyze the data to determine what happens if certain values of some of the fields were different from the values stored in the database during its actual operation. Following embodiments are described using document databases, however the techniques disclosed herein are not limited to document databases and can be applied to a relational database or another type of database.

According to an embodiment, the database is a document database that stores a source dataset comprising a set of documents in a document database. Each document stores values of a set of fields. The system receives an alternate scenario specification that includes instructions for determining alternate values for a portion of the database, for example, a subset of fields of a subset of documents. The system determines an alternate dataset comprising alternate values of the subset of fields for the subset of documents as defined by the alternate scenario specification. In contrast to the alternate dataset, the source dataset represents values of the subset of fields of the subset of documents that are updated based on requests received by the production system independent of the alternate dataset.

The system receives a request for executing a database query using the alternate scenario. The system executes the database query to determine a result set by combining data from the alternate dataset with data from the source dataset. The values of the subset of fields for the subset of documents are obtained from the alternate dataset and remaining data is obtained from the source dataset. The system sends the result set as a response to the request.

The system may receive a request to execute the same database query using a plurality of alternate scenarios. In this case, the system executes the database query to determine a result set by combining data from the plurality of alternate datasets with remaining data obtained from the source dataset.

The system may receive a request to execute the same database query without using any alternate scenarios. Accordingly, the system executes the database query using the source dataset without using any alternate dataset.

The system may be a production system that updates the source dataset on a continuous basis, for example, as requests are received. Accordingly, the same query received after a time interval for execution using the alternate scenario may return a different result set even if the values of the alternate dataset remain unchanged.

According to an embodiment, the alternate scenario specification may cause the alternate dataset to be modified using a different source of requests compared to the source of requests that updates the source dataset. For example, the values of the alternate dataset may change in a manner different from the source dataset.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 4 shows a flowchart illustrating a process for processing a database query using an alternate scenario, according to an embodiment.

Embodiments of the invention include methods described herein, a non-transitory computer readable storage medium storing instructions for performing steps of the methods disclosed herein, and systems comprising processors and computer readable non-transitory storage medium to perform steps of the methods disclosed herein.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the disclosed subject matter.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
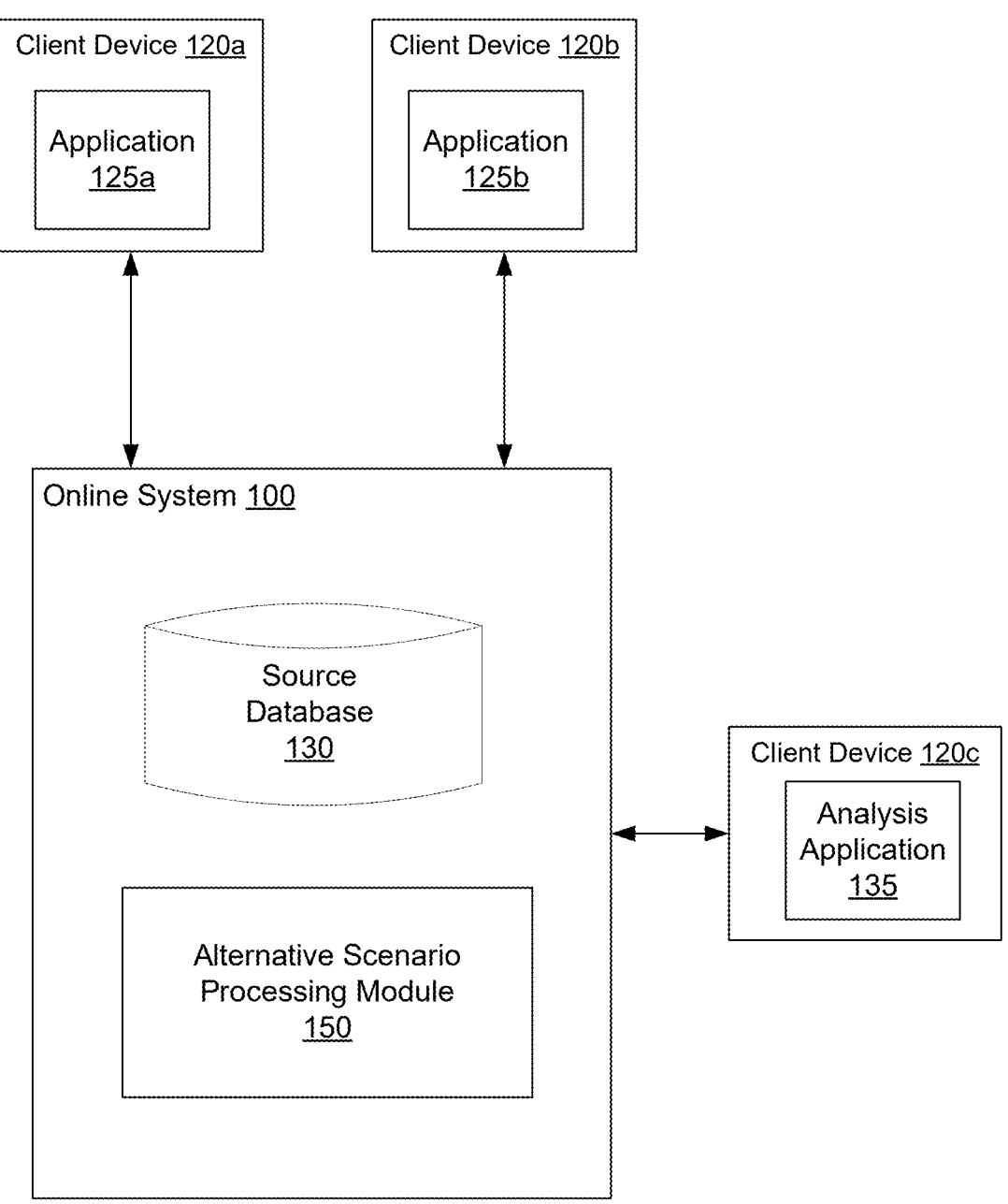
FIG. 1 shows the overall environment in which alternate scenarios of a database are defined and used for analysis, according to an embodiment.

FIG. 1 and the other figures use like reference numerals to identify like elements. A letter after a reference numeral, such as "120a," indicates that the text refers specifically to the element having that particular reference numeral. A reference numeral in the text without a following letter, such as "120," refers to any or all of the elements in the figures bearing that reference numeral (e.g. "120" in the text refers to reference numerals "120a" and/or "120b" in the figures).

DETAILED DESCRIPTION

A system according to various embodiments allows users to define alternate scenarios of data stored in a database and analyze the data using alternate scenarios. An alternate scenario may also be referred to herein as a what-if scenario, indicating that the user is indicating an interest in determining "what" the result of certain queries would be "if" the data was different from the actual values stored.

The system receives an alternate scenario specification that describes the alternate scenario. The alternate scenario specification may also be referred to as the what-if specification of data. The alternate scenario specification may describe a specific subset of the data stored in the database as well as the values stored in that subset of data. For example, if the database is a document database, the alternate scenario specification may identify a subset of documents and a subset of fields of the subset of documents. The alternate scenario specification further describes the values of the subset of fields of the subset of documents. For example, specific fields may be assigned fixed values or value changing over time. The alternate scenario specification may specify that the alternate values of the fields may be updated based on requests received from an alternate source that is independent of the source of requests for the production system that updates the data stored in the database.

FIG. 1 shows the overall environment in which alternate scenarios of a database are defined and used for analysis, according to an embodiment. The overall system environment includes an online system 100 and one or more client devices 120a, 120b, 120c. FIG. 1 illustrates the online system 100 as a computing system that is connected to other systems via a computer network and can communicate with the other systems via the computer network (not shown in FIG. 1). In various embodiments, more or fewer components than those indicated in FIG. 1 may be used. For example, there may be more or fewer instances of client devices 120 shown in FIG. 1.

The online system includes a source database 130 (a source database also referred to herein as a database or a production database) and an alternative scenario processing module 150. Users can interact with the online system using client devices 120a, 120b that run an application 125a, 125b respectively. The application 125 may be the browser that allows users to send requests to the online system 100 and to receive results provided by the online system 100, for example, via a user interface. Alternatively, the application 125 may be proprietary application.

The online system 100 may be a production system such that the source database 130 is a production database that is populated using requests received in a production environment. The requests may perform transactions that include operations such as update, delete, or insert new data. For example, if the source database 130 is a relational database, the requests received in the production environment may insert new rows in the tables of the relational database, update existing rows, or delete existing rows. If the source database 130 is a document, database, the requests may add new documents to the database, delete existing documents, or update fields of existing documents.

The alternative scenario processing module 150 receives and processes an alternative scenario specification to determine metadata describing the alternative scenario. The alternative scenario processing module 150 further maintains data associated with the alternative scenario and processes database queries using the alternative scenario.

The alternative scenario specification may specify a filter condition to identify a subset of data stored in the database. For example, if the database is a document database, the alternative scenario specification filter documents using certain criteria, for example, a boolean expression based on certain fields of the documents. The alternate scenario includes the document if the boolean expression evaluates to true and excludes the document otherwise.

The alternative scenario specification further specifies how the field values are populated in the filtered dataset. The alternative scenario specification may provide explicit values for certain fields. The alternative scenario specification may specify that all documents that satisfy certain condition have the field value assigned to certain value or the field value determined using a particular expression. For example, if documents conform to a schema with fields f1 and f2, the alternative scenario specification may specify that all documents in which f1="value1" have f2="value2" in the alternate scenario, independent of the actual value of the field f2 in the documents in the database. As another example, for the exemplary schema mentioned above, the alternative scenario specification may specify that all documents in which f1=N (where N representing a numeric value), have f2=f(N), where f is a function comprising an expression based on N in the alternate scenario, independent of the actual value of the field f2 in the documents in the database.

According to an embodiment, the alternative scenario specification may specify a time constraint indicating that the subset of data has alternate values for a specific interval of time. For example, the alternative scenario specification may specify a time interval during which a subset of data has alternate values, whereas outside the time interval, the subset of data reverts back to values of the source dataset.

The online system 100 may be hosted on one or more computing systems, each computing system including one or more processors, memory, secondary storage and input/output controller. Each computing system used for hosting the components of the online system 100 is typically a server class system that uses powerful processors, large memory, and fast input/output systems compared to a typical computing system used, for example, as a client device 120.

The client devices 120 represent various systems that interact with the online system 100 via a computer network. These devices may represent servers, routers, storage devices, and so on. One or more devices may be attached to peripheral devices, such as printers. The devices communicate with each other via the computer network. The computer network may comprise any combination of local area and/or wide area networks, using both wired and/or wireless communication systems. In one embodiment, the network uses standard communications technologies and/or protocols. In another embodiment, the components of the system environment can use custom and/or dedicated data communications technologies instead of, or in addition to, the ones described above.

Figure 2:
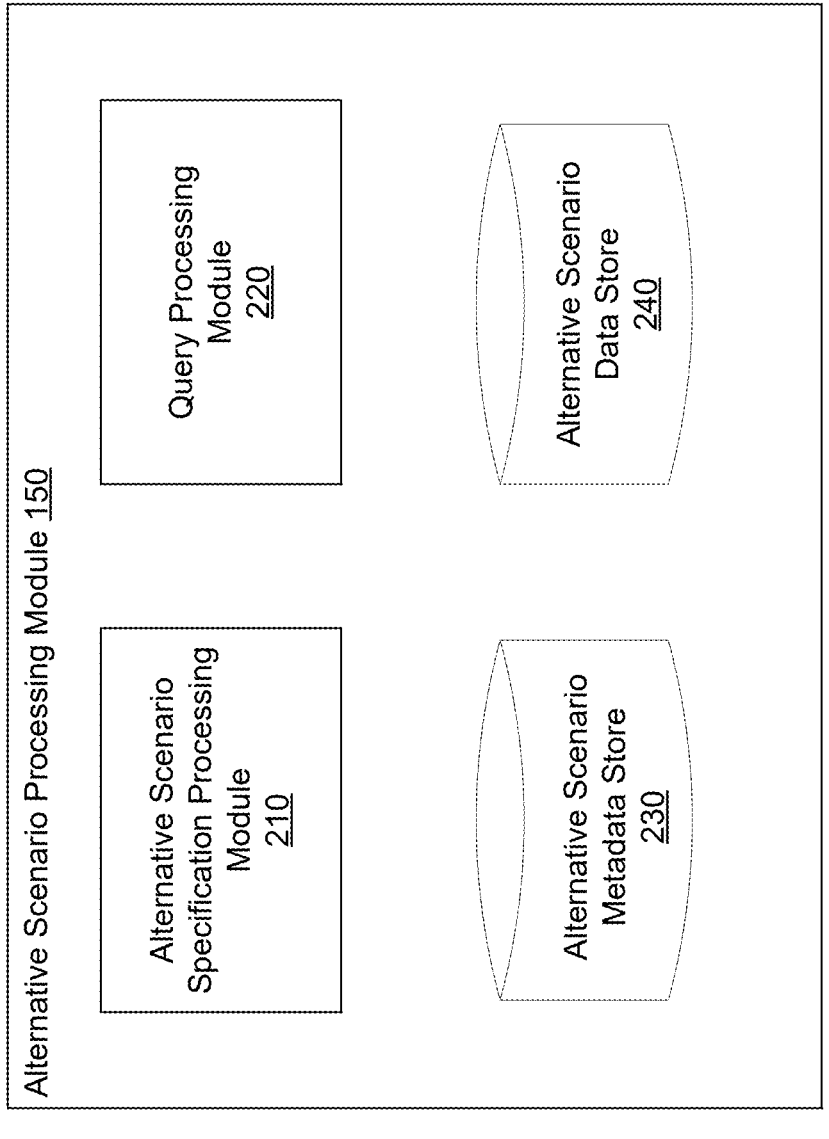
FIG. 2 shows the system architecture of alternative scenario processing module according to an embodiment.

FIG. 2 shows the system architecture of alternative scenario processing module according to an embodiment. The alternative scenario processing module 150 includes an alternative scenario specification processing module 210, a query processing module 220, an alternative scenario metadata store 230, and an alternative scenario data store 240. Other embodiment may include more or fewer modules than those indicated herein.

The alternative scenario processing module 150 stores metadata describing the alternative scenario specification in the alternative scenario metadata store 230. The alternative scenario specification processing module 210 may store additional data in the alternative scenario data store 240 to manage the alternative scenarios for the database. The alternative scenario metadata store 230 and alternative scenario data store 240 may be part of the source database 130. The alternative scenario processing module 150 may support commands that allow users to define, delete, or modify alternative scenario specifications.

The query processing module 220 receives database queries from client devices and processes them. A request received from a client device for processing a database query may identify an alternate scenario. In this situation, the online system 100 executes the database query using data of the identified alternate scenario. According to an embodiment, the query processing module 220 modifies the database query to generate one or more alternate database queries that retrieve data from the alternate dataset and combine the data with the data obtained from the source dataset. The query processing module 220 may generate separate queries to obtain a result set from the alternate dataset and a result set from the source dataset and combine the two result sets using a third database query. Alternatively, the query processing module 220 may generate a join query that combines information from the source dataset with the information from the alternate dataset according to the alternate scenario specification. The query processing module 220 executes the transformed query or queries to determine the result set instead of the database query that was received from the client device.

The query processing module 220 executes the database query using the data as specified in the corresponding alternate scenario specification combined with other data stored in the database. A request received from a client device for processing a database query may identify multiple alternate scenarios. In this situation, the query processing module 220 determines the result of execution of the database query by combining the data from each of the specified alternate scenario specification with the remaining data stored in the database.

According to an embodiment, the request received from a client device for processing a database query the database query specifies a plurality of alternate scenario specifications in an order and the system evaluates the alternate scenarios in the order specified. The order in which multiple alternate scenario specifications are specified for executing a database query is referred to herein as a datapath. For example, the datapath may specify two alternate scenario specifications "datapath=A1;A2;A3" and the system evaluates the database query by applying the alternate scenarios according to the order specified in the datapath. Accordingly, if a field F1 of a document D1 is specified in both alternate scenarios A1 and A2, the value applied is determined based on the order in which the two alternate scenarios are specified in the datapath. For example, if the datapath=A1;A2, the value specified in alternate scenario A1 is applied to the field F1 of a document D1, whereas if the datapath=A2;A1, the value specified in alternate scenario A2 is applied to the field F1 of a document D1.

A request received from a client device for processing a database query may not identify any alternate scenario. In this situation, the online system 100 executes the database query using data of the database without considering any of the alternate scenarios that may have been defined in the alternative scenario processing module 150.

Figure 3:
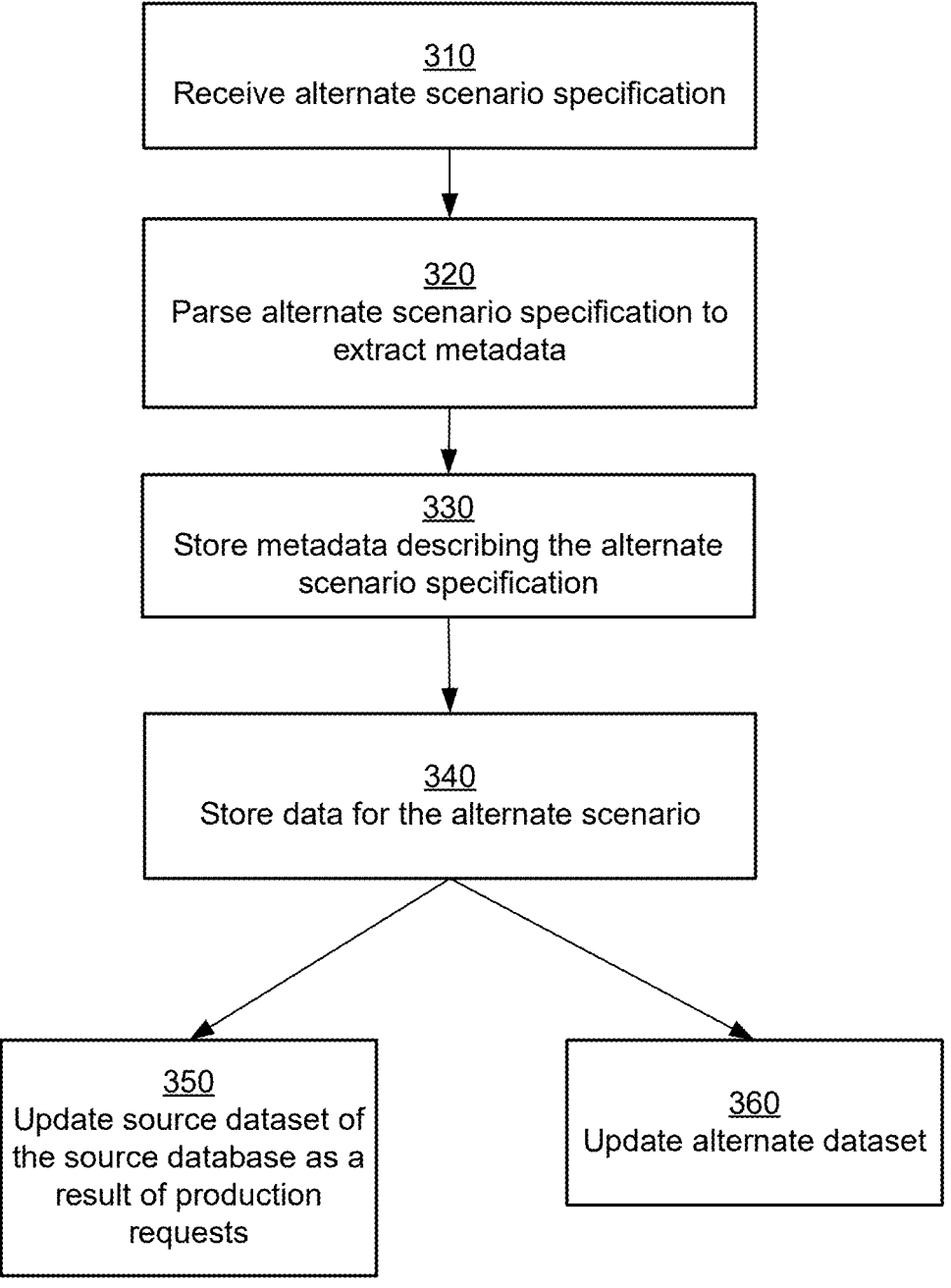
FIG. 3 shows a flowchart illustrating a process for processing an alternate scenario specification, according to an embodiment.

FIG. 3 shows a flowchart illustrating a process for processing an alternate scenario specification, according to an embodiment. The steps of the process are executed by a system, for example, the online system 100 and may be executed by a module such as alternative scenario processing module 150. The steps may be executed in an order different from that indicated herein.

The alternative scenario processing module 150 receives 310 alternative scenario specifications from client devices. The client device may send a request to execute a command such as add an alternative scenario specification or modify an existing alternative scenario specification.

The alternative scenario processing module 150 parses 320 the alternative scenario specification to determine various components specified in the alternative scenario specification. The alternative scenario processing module 150 stores the metadata describing the alternative scenario specified using the alternative scenario specification in the alternative scenario metadata store 230.

The alternative scenario processing module 150 stores an alternate dataset associated with the alternative scenario specified using the alternative scenario specification in the alternative scenario data store 240. The data stored in the source database 130 comprises a source dataset. The alternate dataset represents a set of alternate values for a subset of the source dataset. The alternate dataset may conform to a subset of the schema of the dataset stored in the source database 130 of the online system 100. The alternate dataset may comprise fixed values or values changing over time in a manner independent of the source dataset stored in the source database 130.

The alternative scenario processing module 150 updates the source dataset of the source database based on requests received from client devices. For example, if the online system 100 is a production system, the data of the source database 130 is updated based on requests for transactions performed using data stored in the source database 130.

The alternative scenario processing module 150 updates the alternate dataset in accordance with the alternate scenario specification corresponding to the alternate scenario. For example, the alternate scenario specification may specify fixed values for a subset of fields of a subset of documents of the source database 130. Accordingly, the alternative scenario processing module 150 maintains fixed values in the alternate dataset independent of the changes to the source dataset. The alternate scenario specification may specify values for the alternate dataset that are a function of other values (for example, other values outside the subset of fields of the subset of documents specified in the alternate scenario specification) and change as the other values change. The alternative scenario processing module 150 maintains the alternate dataset by modifying the values as the corresponding input values to the function change. The alternate scenario specification may specify that values of the alternate dataset are updated based on a load, for example, based on requests received from a source of data that is independent of the source of data that updates the source dataset of the source database 130. The alternative scenario processing module 150 receives requests from the alternate source of requests and modifies the values of the alternate dataset based on the requests received. The updates to the alternate dataset may be performed concurrently with the updates to the source database.

FIG. 4 shows a flowchart illustrating a process for processing a database query using an alternate scenario, according to an embodiment. The steps of the process are executed by a system, for example, the online system 100 and may be executed by a module such as alternative scenario processing module 150. The steps may be executed in an order different from that indicated herein.

The query processing module 220 receives 410 a request specifying a database query and zero or more alternate scenario specifications. According to an embodiment, each alternate scenario specification has an identifier, for example, a unique name. A request to execute a database query may specify an identifier for an alternate scenario specification. For example, the request may specify a single alternate scenario specification, two or more alternate scenario specifications, or zero alternate scenario specifications. If multiple alternate scenario specifications are specified for executing a database query, the request for executing the database query specifies a datapath that specifies an order of preference in which the alternate scenario specifications are applied.

The query processing module 220 executes 430 the database query to determine a result set by combining data from the alternate datasets specified in the request with data from the source dataset. If the database query processes a field of a document that belongs to the subset of fields of the subset of documents specified in an alternate scenario specification, the value of the field is obtained from the corresponding alternate dataset of the alternate scenario. Any remaining values of fields for determining the result set are obtained from the source dataset.

The query processing module 220 sends 440 the result set determined by executing the database query to the requestor, for example, a client application running on a client device that sent the request.

Following are examples illustrating the use of alternate scenarios. For example, the database query may specify fields f1 and f2 in an expression E. Assume that the alternate scenario A1 identified in the request specifies a value for the field f2 for a set S1 of documents. The database query may include a filter condition that determines a set S2 of documents for processing. If a document D1 processed by the database query belongs to the set S1, the query processing module 220 evaluates the expression E using value of field f1 from the source dataset and the value of field f2 from the alternate dataset. If a document D2 processed by the database query belongs to set S2 but does not belong to set S1 of the alternate scenario, the query processing module 220 evaluates the expression E using values of both fields f1 and f2 from the source dataset without considering the alternate dataset.

Assume that a request R1 specifies a database query Q1 to be executed using two alternate scenarios Ax and Ay. Assume that the alternate scenario specification for Ax specifies values for field fx and the alternate scenario specification for Ay specifies values for field fy. Also assume that the database query Q1 includes an expression based on fields fx, fy, and fz. The field fz is not specified in any alternate scenario specification and is only determined based on the updates to the source database 130 received by the online system, for example, in the production environment. Assume that set of documents specified in the alternate scenario specification for alternate scenario Ax is Sx and the set of documents specified in the alternate scenario specification for alternate scenario Ay is Sy. Assume that the database query includes a filter condition that results in a subset Sz of documents being processed by the database query. According to an embodiment, the filter condition is evaluated on the source dataset to determine the subset Sz before checking if the document belongs to Sx or Sy.

Assume that the subset Sz includes a document Dx that belongs to set Sx but does not belong to set Sy. For fields of the document Dx, the query processing module 220 evaluates the expression E using the value of field fx from alternate scenario Ax, and the values of field fy and fz from the source dataset.

Assume that the subset Sz includes a document Dy that belongs to set Sy but does not belong to set Sx. For fields of the document Dy, the query processing module 220 evaluates the expression E using the value of field fy from alternate scenario Ay, and the values of field fx and fz from the source dataset.

Assume that the subset Sz includes a document Dz that belongs to both sets Sx and set Sy. For fields of the document Dz, the query processing module 220 evaluates the expression E using the value of field fx from alternate scenario Sx, value of field fy from alternate scenario Sy, and the value of field fz from the source dataset. In this example, the fields from two alternate scenarios are non-overlapping. However, the set of fields included in multiple alternate scenario specifications may overlap, thereby modifying the same field in each alternate scenario. In this case, as described herein, the datapath specified for executing a database query is used to determine the precedence applied to the alternate scenarios for evaluating the database query.

Assume that the subset Sz includes a document Dw that does not belong to either of the sets Sx and Sy. For fields of the document Dw, the query processing module 220 evaluates the expression E using the values of all field fx, fy, and fz from the source dataset.

Accordingly, the query processing module 220 determines different results depending on the alternate scenarios specified for executing the database query. The same database query executed at the same time for different alternate scenarios may return different results.

According to an embodiment, the system receives a second request for executing the database query without using the alternate scenario specification. The system executes the database query to determine a second result set using values of the subset of fields from the source dataset, independent of the alternate dataset and sends the second result set as a response to the second request. For example, assume that a request R2 was received that specified that the database query Q1 should be executed without identifying any alternate scenarios. In this example, for all documents Dx, Dy, Dz, and Dw, the expression E will be evaluated using the values of the fields fx, fy, and fz all obtained from the source dataset.

Assume that another request R3 was received that specified that the database query Q1 should be executed using only alternate scenario Ax (and does not identify the alternate scenario Ay.) The subset Sz includes documents Dx, Dy, Dz, and Dw as described above. For fields of the document Dx, the query processing module 220 evaluates the expression E using the value of field fx from alternate scenario Sx, and the values of field fx and fz from the source dataset. For fields of the document Dy, the query processing module 220 evaluates the expression E using the value of field fx, fy, and fz from the source dataset since Dy does not belong to the alternate scenario Sx relevant to this execution. For fields of the document Dw, the query processing module 220 evaluates the expression E using the value of field fx from alternate scenario Sx, values of field fy and fz from the source dataset. For fields of the document Dw, the query processing module 220 evaluates the expression E using the values of all field fx, fy, and fz from the source dataset.

Accordingly, the query processing module 220 determines the values of each field based on the alternate scenario specifications specified in the request for processing the database query.

Figure 5A:
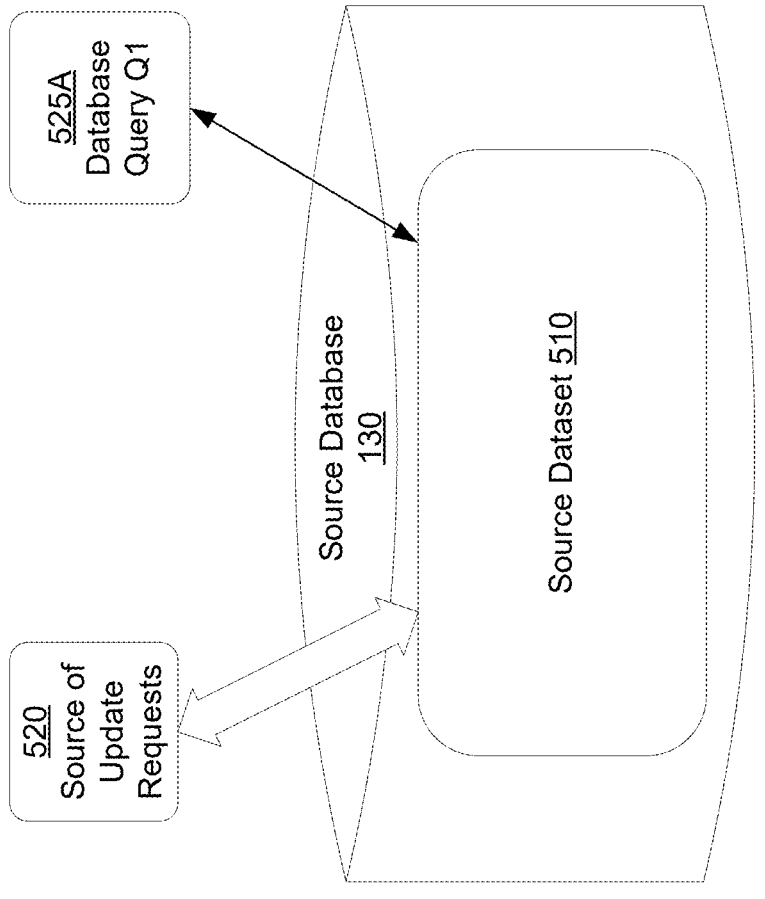
FIG. 5A illustrates updating and querying a dataset stored in a database, according to an embodiment.

FIG. 5A illustrates updating and querying a dataset stored in a database, according to an embodiment. As illustrated in FIG. 5A, a source dataset 510 is stored in the source database 130. The source dataset 510 is updated using requests received from the source 520 of update requests. The query processing module 220 may receive request 525A that specified a database query Q1 that does not specify any alternate scenarios, since none are created in the source database 130. The system executes database query Q1 in response to request 525A using only data of the source dataset 510.

Figure 5B:
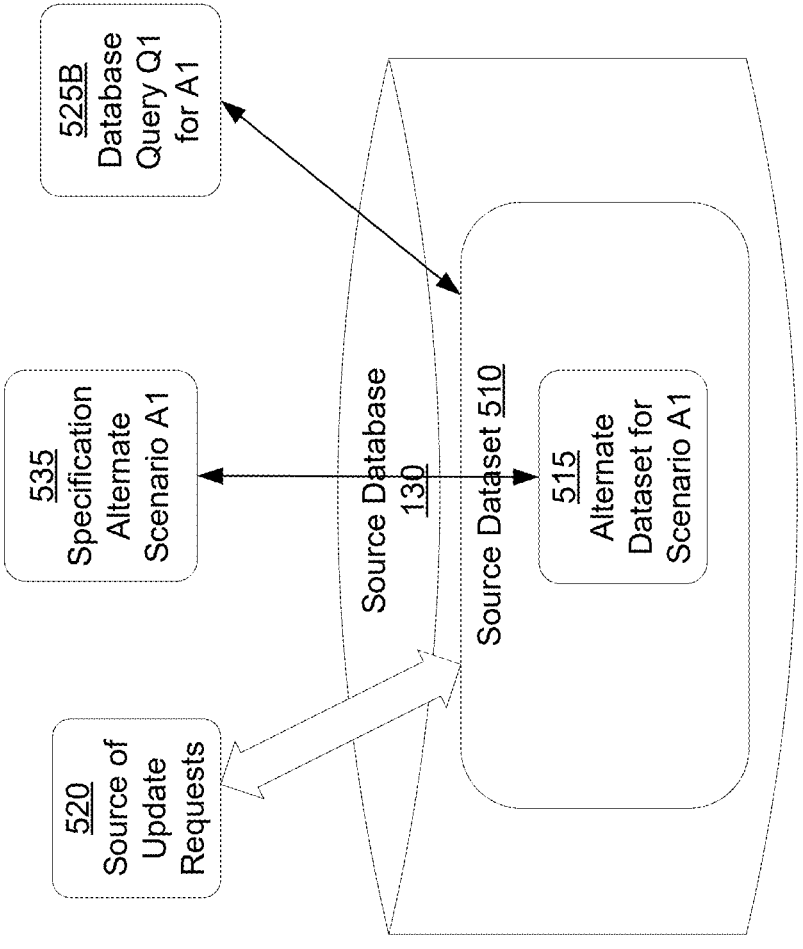
FIG. 5B illustrates updating and querying a dataset with an alternate scenario, according to an embodiment.

FIG. 5B illustrates updating and querying a dataset with an alternate scenario, according to an embodiment. As illustrated in FIG. 5B, a specification for alternate scenario A1 is received and an alternate dataset 515 is created for scenario A1. The source dataset 510 continues to be updated using requests from source 520 of update requests. The system receives a request 525B that specifies execution of database query Q1 using alternate scenario A1. The system executes database query Q1 in response to request 525B using data of alternate dataset for scenario A1 combined with data of the source dataset 510 as necessary.

Figure 5C:
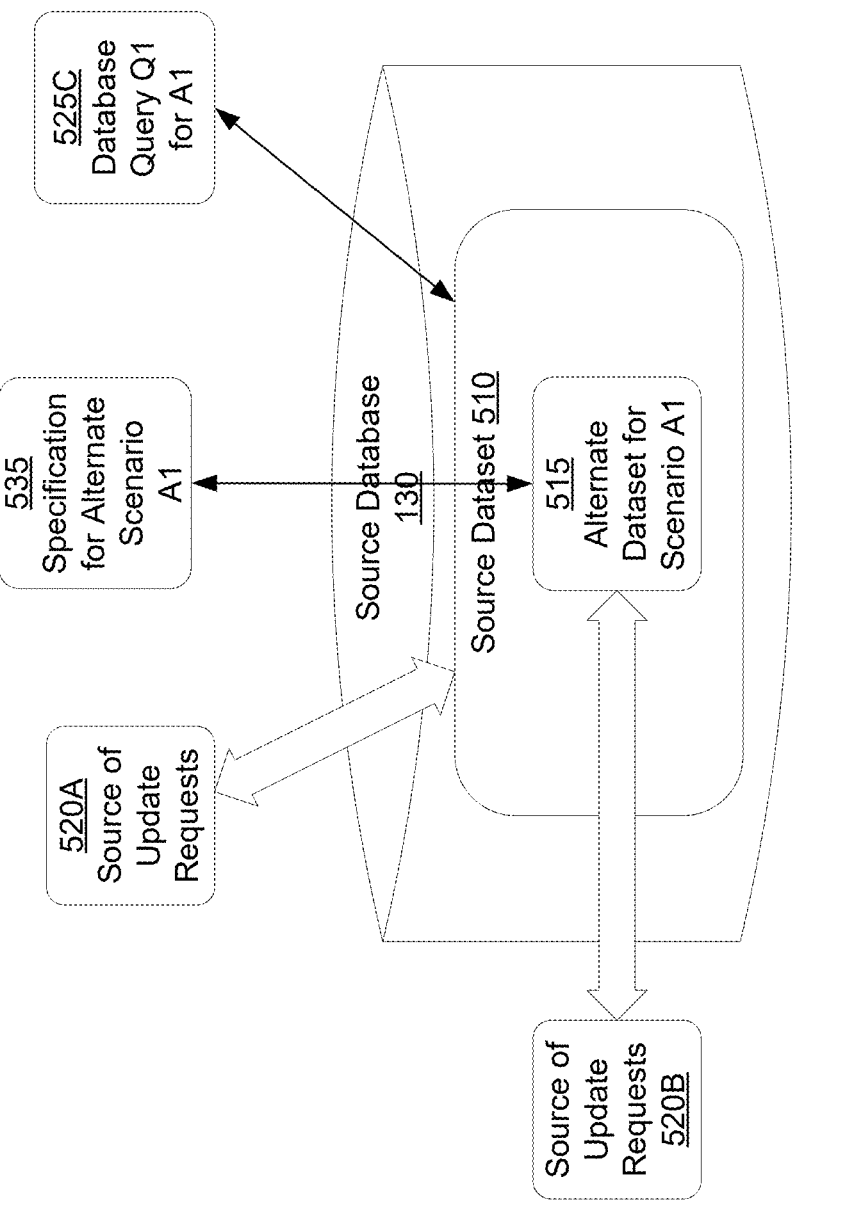
FIG. 5C illustrates updating the alternate dataset independent of the source dataset, according to an embodiment.

FIG. 5C illustrates updating the alternate dataset independent of the source dataset, according to an embodiment. Accordingly, the alternate dataset 515 may be updated using an alternate source 520B of requests that is distinct from the source 520A of requests used for updating the source dataset. The system receives a request 525C that specifies execution of database query Q1 using alternate scenario A1. The system executes database query Q1 in response to request 525C using data of alternate dataset for scenario A1 combined with data of the source dataset 510 as necessary. The use of alternate source 520B for updating the alternate dataset allows the analysis of the system for different types of data distribution for the alternate dataset compared to the source dataset. For example, the alternate dataset may be modified to display a distribution of a very heavy load conditions even if the production environment is not experiencing heavy load, thereby allowing analysis of the system under various conditions that are difficult to observe in a production environment.

Figure 5D:
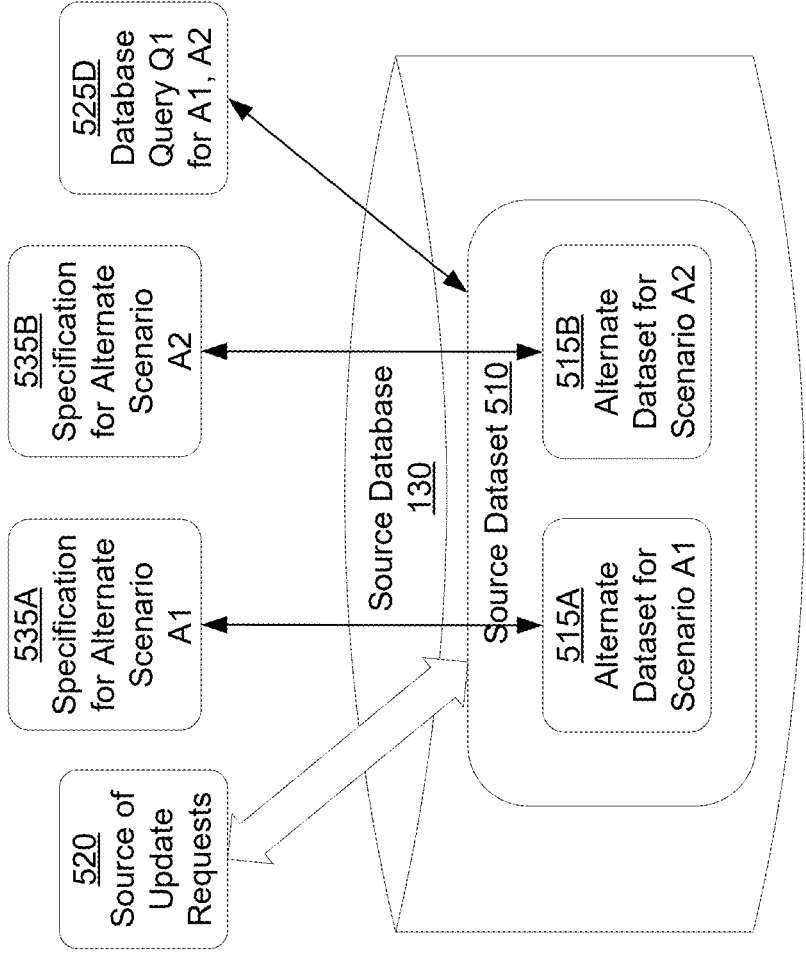
FIG. 5D illustrates updating and querying a dataset with multiple alternate scenarios, according to an embodiment.

FIG. 5D illustrates updating and querying a dataset with multiple alternate scenarios, according to an embodiment. The system receives a request 525D that specifies execution of database query Q1 using alternate scenario A1 and alternate scenario A2. The system executes database query Q1 in response to request 525D using data of alternate dataset for scenario A1 combined with data of alternate dataset for scenario A2 and data of the source dataset 510 as necessary.

Alternate Scenarios in Relational Databases

Although the embodiments are described in terms of document databases, the techniques disclosed herein are applicable to other types of databases such as relational databases. For example, documents of document databases correspond to records (or rows) of tables of relational databases and fields of documents of document databases correspond to fields of records corresponding to columns of relational tables.

Accordingly, a relational database in a production environment stores a source dataset comprising a set of tables, each table comprising a set of rows and columns. Each row represents a tuple of fields, each field representing a value corresponding to a column. Rows are also referred to as records. The system receives an alternate scenario specification comprising instructions for determining alternate values for at least a subset of fields of a subset of records. The system determines an alternate dataset comprising values of the subset of fields for the subset of records according to the alternate scenario specification. The source dataset includes values of the subset of fields of the subset of records that are updated based on requests received by the production system independent of the alternate dataset. The system receives a request for executing a database query using the alternate scenario specification for the relational database. The system executes the database query to determine a result set by combining data from the alternate dataset with data from the source dataset. The values of the subset of fields for the subset of documents are obtained from the alternate dataset and remaining data used for determining the result set is obtained from the source dataset. The system sends the result set as a response to the request.

According to an embodiment, the relational database system receives a second request for executing the database query without using the alternate scenario specification. The relational database system executes the database query to determine a second result set using values of the subset of fields of the subset of records from the source dataset, independent of the alternate dataset and sends the second result set as a response to the second request.

According to an embodiment, the relational database system receives a second alternate scenario specification comprising instructions for determining alternate values for a second subset of fields for a second subset of records. The relational database system determining a second alternate dataset comprising values of the second subset of fields for a second subset of records. The values of the alternate dataset are determined according to the second alternate scenario specification.

According to an embodiment, the relational database system receives a second request for executing the database query using the second alternate scenario specification. The relational database system executes the database query to determine a second result set by combining data from the second alternate dataset with data from the source dataset. The values of the subset of fields for the subset of records are obtained from the second alternate dataset and remaining data is obtained from the source dataset. The system sends the second result set as a response to the second request.

According to an embodiment, the relational database system receives a second request for executing the database query using the first alternate scenario specification and the second alternate scenario specification. The relational database system executes the database query to determine a second result set by combining data from: (1) the first alternate dataset, (2) the second alternate dataset, and (3) data from the source dataset. The values of the first subset of fields for the first subset of records are obtained from the first alternate dataset, values of the second subset of fields for the second subset of records are obtained from the second alternate dataset, and remaining data is obtained from the source dataset. The relational database system sends the second result set as a response to the second request.

According to an embodiment, the relational database system receives a second request for executing the database query using the alternate scenario specification after a time interval, wherein the source dataset is updated during the time interval. The relational database system executes the database query to determine a second result set by combining data from the alternate dataset with updated data from the source dataset. The values of the subset of fields for the subset of records are obtained from the alternate dataset and remaining data used for determining the result set is obtained from the updated source dataset. The relational database system sends the second result set as a response to the second request.

According to an embodiment, the relational database system is used in a production system and is updated based on requests from a first source of requests and the alternate data set is updated using requests from a second source of requests independent of the first source of requests.

Other embodiments described herein in the context of document database system are applicable in the context of relational database system by using records instead of documents such that fields of the documents correspond to fields (or values of corresponding columns) of the records in the relational database system.

Computing Machine Architecture

Figure 6:
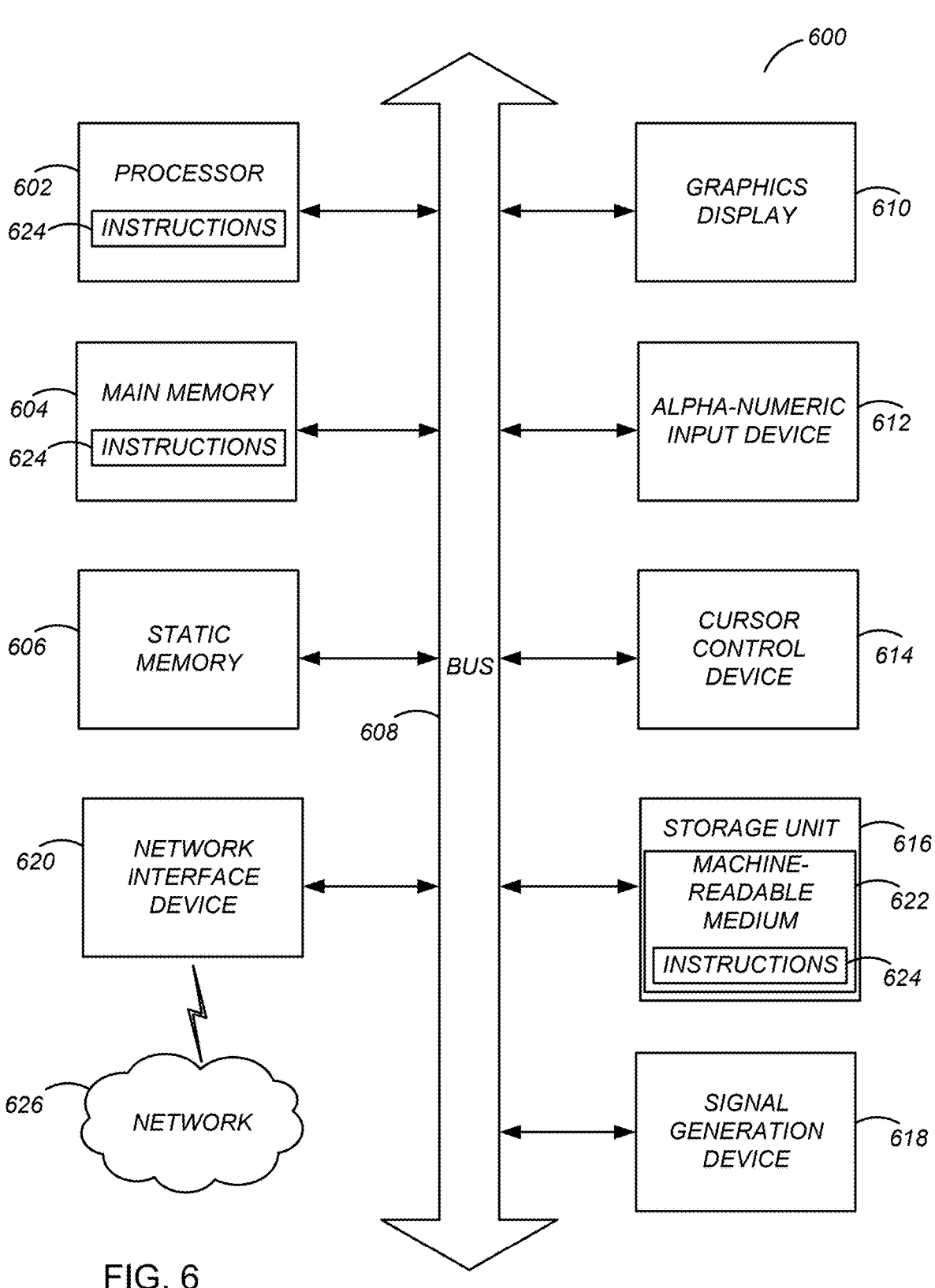
FIG. 6 is a block diagram illustrating components of an example machine able to read instructions from a machine-readable medium and execute them in a processor.

FIG. 6 is a block diagram illustrating components of an example machine able to read instructions from a machine-readable medium and execute them in a processor (or controller). Specifically, FIG. 6 shows a diagrammatic representation of a machine in the example form of a computer system 600 within which instructions 624 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes a processor 602 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 604, and a static memory 606, which are configured to communicate with each other via a bus 608. The computer system 600 may further include graphics display unit 610 (e.g., a plasma display panel (PDP), a liquid crystal display (LCD), a projector, or a cathode ray tube (CRT)). The computer system 600 may also include alphanumeric input device 612 (e.g., a keyboard), a cursor control device 614 (e.g., a mouse, a trackball, a joystick, a motion sensor, or other pointing instrument), a storage unit 616, a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 (e.g., software) may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 (e.g., software) may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., instructions 624) for execution by the machine and that cause the machine to perform any one or more of the methodologies disclosed herein. The term "machine-readable medium" includes, but not be limited to, data repositories in the form of solid-state memories, optical media, and magnetic media.

Alternative Embodiments

It is to be understood that the figures and descriptions of the present invention have been simplified to illustrate elements that are relevant for a clear understanding of the present invention, while eliminating, for the purpose of clarity, many other elements found in a typical system. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for generating reports based on instrumented software through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for managing alternate scenarios in a database, the method comprising:

storing a source dataset comprising a set of documents in a document database of a production system, each document storing values of a set of fields, wherein the document database of the production system is updated based on requests from a first source of requests and an alternate dataset is updated using requests from a second source of requests independent of the first source of requests;

receiving an alternate scenario specification comprising instructions for determining alternate values for at least a subset of fields of a subset of documents;

determining an alternate dataset comprising values of the subset of fields for the subset of documents according to the alternate scenario specification, wherein the source dataset includes values of the subset of fields of the subset of documents that are updated based on requests received by the production system independent of the alternate dataset;

receiving a request for executing a database query using the alternate scenario specification;

executing the database query to determine a result set by combining data from the alternate dataset with data from the source dataset, wherein values of the subset of fields for the subset of documents are obtained from the alternate dataset and remaining data used for determining the result set is obtained from the source dataset; and sending the result set as a response to the request.

2. The method of claim 1, wherein the request is a first request, the method further comprising:

receiving a second request for executing the database query without using the alternate scenario specification;

executing the database query to determine a second result set using values of the subset of fields of the subset of documents from the source dataset, independent of the alternate dataset; and sending the second result set as a response to the second request.

3. The method of claim 1, wherein the alternate scenario specification is a first alternate scenario specification, the alternate dataset is a first alternate dataset, the method further comprising:

receiving a second alternate scenario specification comprising instructions for determining alternate values for a second subset of fields for a second subset of documents; and determining a second alternate dataset comprising values of the second subset of fields for a second subset of documents, wherein the values of the alternate dataset are determined according to the second alternate scenario specification.

4. The method of claim 3, wherein the request is a first request, the result set is a first result set, the method further comprising:

receiving a second request for executing the database query using the second alternate scenario specification;

executing the database query to determine a second result set by combining data from the second alternate dataset with data from the source dataset, wherein values of the subset of fields for the subset of documents are obtained from the second alternate dataset and remaining data is obtained from the source dataset; and sending the second result set as a response to the second request.

5. The method of claim 3, wherein the request is a first request, the result set is a first result set, the method further comprising:

receiving a second request for executing the database query using the first alternate scenario specification and the second alternate scenario specification;

executing the database query to determine a second result set by combining data from: (1) the first alternate dataset, (2) the second alternate dataset, and (3) data from the source dataset, wherein values of the first subset of fields for the first subset of documents are obtained from the first alternate dataset, values of the second subset of fields for the second subset of documents are obtained from the second alternate dataset, and remaining data is obtained from the source dataset; and sending the second result set as a response to the second request.

6. The method of claim 1, wherein the request is a first request, wherein the alternate scenario specification specifies a constant set of values as alternate values for the subset of fields for the subset of documents, the method further comprising:

receiving a second request for executing the database query using the alternate scenario specification after a time interval, wherein the source dataset is updated during the time interval;

executing the database query to determine a second result set by combining data from the alternate dataset with updated data from the source dataset, wherein values of the subset of fields for the subset of documents are obtained from the alternate dataset and remaining data used for determining the result set is obtained from the updated source dataset; and sending the second result set as a response to the second request.

7. A non-transitory computer readable storage medium storing instructions that when executed by one or more computer processors, cause the one or more computer processors to perform steps for managing alternate scenarios in a database, the steps comprising:

storing a source dataset comprising a set of documents in a document database of a production system, each document storing values of a set of fields, wherein the document database of the production system is updated based on requests from a first source of requests and an alternate dataset is updated using requests from a second source of requests independent of the first source of requests;

receiving an alternate scenario specification comprising instructions for determining alternate values for at least a subset of fields of a subset of documents;

determining an alternate dataset comprising values of the subset of fields for the subset of documents according to the alternate scenario specification, wherein the source dataset includes values of the subset of fields of the subset of documents that are updated based on requests received by the production system independent of the alternate dataset;

receiving a request for executing a database query using the alternate scenario specification;

executing the database query to determine a result set by combining data from the alternate dataset with data from the source dataset, wherein values of the subset of fields for the subset of documents are obtained from the alternate dataset and remaining data used for determining the result set is obtained from the source dataset; and sending the result set as a response to the request.

8. The non-transitory computer readable storage medium of claim 7, wherein the request is a first request, wherein the instructions further cause the one or more computer processors to perform steps comprising:

receiving a second request for executing the database query without using the alternate scenario specification;

executing the database query to determine a second result set using values of the subset of fields of the subset of documents from the source dataset, independent of the alternate dataset; and sending the second result set as a response to the second request.

9. The non-transitory computer readable storage medium of claim 7, wherein the alternate scenario specification is a first alternate scenario specification, the alternate dataset is a first alternate dataset, wherein the instructions further cause the one or more computer processors to perform steps comprising:

receiving a second alternate scenario specification comprising instructions for determining alternate values for a second subset of fields for a second subset of documents; and determining a second alternate dataset comprising values of the second subset of fields for a second subset of documents, wherein the values of the alternate dataset are determined according to the second alternate scenario specification.

10. The non-transitory computer readable storage medium of claim 9, wherein the request is a first request, the result set is a first result set, wherein the instructions further cause the one or more computer processors to perform steps comprising:

receiving a second request for executing the database query using the second alternate scenario specification;

executing the database query to determine a second result set by combining data from the second alternate dataset with data from the source dataset, wherein values of the subset of fields for the subset of documents are obtained from the second alternate dataset and remaining data is obtained from the source dataset; and sending the second result set as a response to the second request.

11. The non-transitory computer readable storage medium of claim 9, wherein the request is a first request, the result set is a first result set, wherein the instructions further cause the one or more computer processors to perform steps comprising:

receiving a second request for executing the database query using the first alternate scenario specification and the second alternate scenario specification;

executing the database query to determine a second result set by combining data from: (1) the first alternate dataset, (2) the second alternate dataset, and (3) data from the source dataset, wherein values of the first subset of fields for the first subset of documents are obtained from the first alternate dataset, values of the second subset of fields for the second subset of documents are obtained from the second alternate dataset, and remaining data is obtained from the source dataset; and sending the second result set as a response to the second request.

12. The non-transitory computer readable storage medium of claim 7, wherein the request is a first request, wherein the alternate scenario specification specifies a constant set of values as alternate values for the subset of fields for the subset of documents, wherein the instructions further cause the one or more computer processors to perform steps comprising:

receiving a second request for executing the database query using the alternate scenario specification after a time interval, wherein the source dataset is updated during the time interval;

executing the database query to determine a second result set by combining data from the alternate dataset with updated data from the source dataset, wherein values of the subset of fields for the subset of documents are obtained from the alternate dataset and remaining data used for determining the result set is obtained from the updated source dataset; and sending the second result set as a response to the second request.

13. A computer system comprising:

one or more computer processors; and a non-transitory computer readable storage medium storing instructions that when executed by one or more computer processors, cause the one or more computer processors to perform steps for managing alternate scenarios in a database, the steps comprising:

storing a source dataset comprising a set of documents in a document database of a production system, each document storing values of a set of fields, wherein the document database of the production system is updated based on requests from a first source of requests and an alternate dataset is updated using requests from a second source of requests independent of the first source of requests;

receiving an alternate scenario specification comprising instructions for determining alternate values for at least a subset of fields of a subset of documents;

determining an alternate dataset comprising values of the subset of fields for the subset of documents according to the alternate scenario specification, wherein the source dataset includes values of the subset of fields of the subset of documents that are updated based on requests received by the production system independent of the alternate dataset;

receiving a request for executing a database query using the alternate scenario specification;

executing the database query to determine a result set by combining data from the alternate dataset with data from the source dataset, wherein values of the subset of fields for the subset of documents are obtained from the alternate dataset and remaining data used for determining the result set is obtained from the source dataset; and sending the result set as a response to the request.

14. The computer system of claim 13, wherein the request is a first request, wherein the instructions further cause the one or more computer processors to perform steps comprising:

receiving a second request for executing the database query without using the alternate scenario specification;

executing the database query to determine a second result set using values of the subset of fields of the subset of documents from the source dataset, independent of the alternate dataset; and sending the second result set as a response to the second request.

15. The computer system of claim 13, wherein the alternate scenario specification is a first alternate scenario specification, the alternate dataset is a first alternate dataset, wherein the instructions further cause the one or more computer processors to perform steps comprising:

receiving a second alternate scenario specification comprising instructions for determining alternate values for a second subset of fields for a second subset of documents; and determining a second alternate dataset comprising values of the second subset of fields for a second subset of documents, wherein the values of the alternate dataset are determined according to the second alternate scenario specification.

16. The computer system of claim 15, wherein the request is a first request, the result set is a first result set, wherein the instructions further cause the one or more computer processors to perform steps comprising:

receiving a second request for executing the database query using the second alternate scenario specification;

executing the database query to determine a second result set by combining data from the second alternate dataset with data from the source dataset, wherein values of the subset of fields for the subset of documents are obtained from the second alternate dataset and remaining data is obtained from the source dataset; and sending the second result set as a response to the second request.

17. The computer system of claim 15, wherein the request is a first request, the result set is a first result set, wherein the instructions further cause the one or more computer processors to perform steps comprising:

receiving a second request for executing the database query using the first alternate scenario specification and the second alternate scenario specification;

executing the database query to determine a second result set by combining data from: (1) the first alternate dataset, (2) the second alternate dataset, and (3) data from the source dataset, wherein values of the first subset of fields for the first subset of documents are obtained from the first alternate dataset, values of the second subset of fields for the second subset of documents are obtained from the second alternate dataset, and remaining data is obtained from the source dataset; and sending the second result set as a response to the second request.

18. The computer system of claim 13, wherein the request is a first request, wherein the alternate scenario specification specifies a constant set of values as alternate values for the subset of fields for the subset of documents, wherein the instructions further cause the one or more computer processors to perform steps comprising:

receiving a second request for executing the database query using the alternate scenario specification after a time interval, wherein the source dataset is updated during the time interval;

executing the database query to determine a second result set by combining data from the alternate dataset with updated data from the source dataset, wherein values of the subset of fields for the subset of documents are obtained from the alternate dataset and remaining data used for determining the result set is obtained from the updated source dataset; and sending the second result set as a response to the second
  request.

* * * * *